United States Patent [19]

Matuo

[11] Patent Number: 4,545,344

[45] Date of Patent: Oct. 8, 1985

[54] DIESEL ENGINE HAVING TURBULENT COMBUSTION CHAMBER

[75] Inventor: Yuji Matuo, Hiroshima, Japan

[73] Assignee: Mazda Motor Corporation, Hiroshima, Japan

[21] Appl. No.: 601,351

[22] Filed: Apr. 17, 1984

[30] Foreign Application Priority Data

Apr. 30, 1983 [JP] Japan .................................. 58-76650

[51] Int. Cl.[4] ............................................. F02B 19/18
[52] U.S. Cl. ..................................... 123/286; 123/263
[58] Field of Search ............... 123/263, 255, 281, 284, 123/285, 286, 290

[56] References Cited

U.S. PATENT DOCUMENTS

| | | | |
|---|---|---|---|
| 3,398,726 | 8/1968 | Bricout | 123/273 |
| 4,395,983 | 8/1983 | Hamai et al. | 123/263 |
| 4,426,966 | 1/1984 | Huther et al. | 123/286 |

FOREIGN PATENT DOCUMENTS

| | | | |
|---|---|---|---|
| 0008907 | 1/1977 | Japan . | |
| 0029512 | 3/1977 | Japan | 123/286 |
| 0151709 | 11/1979 | Japan . | |
| 0123311 | 9/1980 | Japan | 123/286 |
| 0051215 | 3/1983 | Japan | 123/286 |

*Primary Examiner*—Parshotam S. Lall
*Attorney, Agent, or Firm*—Burns, Doane, Swecker & Mathis

[57] ABSTRACT

A diesel engine having a turbulent combustion chamber, a cylinder bore, a piston reciprocatingly accommodated within the cylinder bore and defining a primary combustion chamber in cooperation with the cylinder bore, a connecting throat defined therein for communicating between the primary chamber and the turbulent chamber, and a fuel injection nozzle for injecting fuel into the turbulent chamber. The turbulent chamber is constituted by an inclined flat bottom wall and a generally spherical wall, and at least a portion of the flat bottom wall is positioned inwardly of the sphere generally represented by the spherical wall with its periphery inwardly curved and continued to the spherical wall. The connecting throat has one end opening into the turbulent chamber and the other end opening into the primary chamber, the opening of the one end of the throat being larger than that of the other end of the throat, having its substantially intermediate portion increasing in effective cross-sectional surface area in a direction towards the turbulent chamber.

8 Claims, 11 Drawing Figures

DIESEL ENGINE HAVING TURBULENT COMBUSTION CHAMBER

BACKGROUND OF THE INVENTION

The present invention generally relates to a diesel engine of a type having a turbulent combustion chamber and, more particularly, to the structure of the turbulent combustion chamber.

A diesel engine having, in addition to a primary combustion chamber with a piston movably supported therein, a turbulent combustion chamber communicated with the primary combustion chamber through a connecting throat is not a recent development and has long been will known in the art. In this type of diesel engine, the primary and turbulent combustion chambers are so functionally correlated that fuel oil can be injected into the turbulent combustion chamber to mix with a swirling flow of air induced therein by the introduction through the connecting throat of the air being then compressed within the primary combustion chamber. The air-fuel mixture so created within the turbulent combustion chamber is subsequently ignited by a heater plug or glow plug at the start of the engine, or by the elevated temperature of the compressed air during the normal operation of the engine, thereby producing the expanding gases, caused by the combustion, which is in turn spurted into the primary combustion chamber to drive the piston.

Since the diesel engine of the above described type requires the provision of a water-cooled jacket adjacent and exteriorly around the turbulent combustion chamber for cooling the latter, and since in the diesel engine of the above described type the increased temperature of the compressed air is apt to decrease as it flows at high velocity from the primary combustion chamber into the turbulent combustion chamber throttled through the connecting throat, the temperature of the wall defining the turbulent combustion chamber may remain relatively low at the time of start of the engine where the ambient temperature is very low such as during the winter season, and will not readily increase to a required value even during the subsequent warm-up of the engine. The consequence is that fuel oil injected into the turbulent combustion chamber will not be sufficiently vaporized and, therefore, will not be mixed uniformly with the air swirling within the turbulent combustion chamber, thereby posing problems associated with the difficulty to ignite the mixture at the time of start of the engine and the failure to continue the firing of the mixture subsequent to the start of the engine. As is well known to those skilled in the art, these problems in turn result in the emission of not only unburned exhaust gases, but also a white smoke consisting of steam accompanied by the unburned exhaust gases.

In an attempt to obviate the above described problems which often arise during the start and the subsequent warm-up of the engine, a method has been employed to advance the fuel injection timing for a predetermined degree to increase the delay period, or ignition lag, i.e., the period from the beginning of the fuel injection to the moment of ignition so that the time increment can be utilized for facilitating the mixing of fuel with air within the turbulent combustion chamber. As a matter of practice, the advancement of the ignition timing depends on the cetane number of the fuel used and the ambient temperature in which the engine is operated, and, for example, in the North America Continent where the weather is relatively cold and the fuel of small cetane number is widely used, the fuel injection timing is advanced a relatively great value.

It has, however, been found that the above discussed method to advance the fuel injection timing for the purpose of minimizing the diesel knocking results in the increased generation of noises. Specifically, the advancement of the fuel injection timing to increase the delay period means that a correspondingly increased amount of fuel air is injected before the actual ignition thereof and the resultant mixture of fuel oil with air is ignited at several points within the turbulent combustion chamber, accompanied by a sudden, great pressure rise which in turn result in shaking of the cylinder wall and the cranking mechanism thereby constituting a cause of the noise generation.

Figure 1:
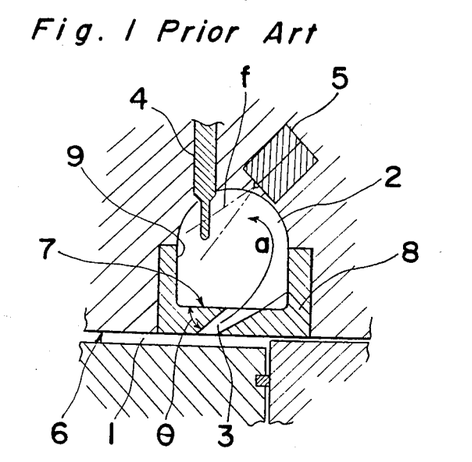
FIG. 1 is a longitudinal sectional view of the prior art diesel engine showing the details of the turbulent combustion chamber.

Apart from the above discussed method, another method for the improvement of the engine starting performance has been suggested, for example, in Japanese Laid-open Patent Publication No. 54-151709, first published Nov. 29, 1979, wherein there is employed, as shown in FIG. 1 of the accompanying drawings, the connecting throat 3 having its effective cross-sectional surface area gradually increasing from its opening confronting the primary combustion chamber 1 towards its opposite opening confronting the turbulent combustion chamber 2 such that, during the compression stroke, the air entering the turbulent combustion chamber 2 to create a swirling air a can be retarded to avoid both the reduction in temperature of the air within the turbulent combustion chamber which would occur in heat-exchange with the swirling air and the blow-off of once-ignited fuel oil which may be caused by the strong swirling flow of the air and that, during the subsequent expansion stroke, the ignited mixture directed towards the primary combustion chamber can, as it flows through the connecting throat 3, be substantially throttled to increase the velocity energy of the ignited mixture thereby to improve the combustibility of the mixture within the primary combustion chamber 1.

Although the above mentioned publication is silent as to the direction in which the fuel oil is injected from the fuel injection nozzle 5, the drawings employed therein clearly illustrate that the fuel oil f injected from the nozzle 5, the position and the angle of which are generally determined in dependence on those of the glow plug 4, is shown as traveling so as to impinge upon a side wall 9 defined in an insert 8 having a flat-bottomed recess with the flat bottom 7 lying in parallel to the undersurface 6 of the cylinder head. In this prior art structure, it has been found that, although the starting and warm-up performance of the engine can be somewhat improved, the mixing of the injected fuel oil with the swirling air a does not take place favorably because the injected fuel oil impinging upon the side wall 9 is then scattered in the same direction as the direction of travel of the swirling air a, forming a film of fuel oil on the side wall 9 and the flat bottom 7. Therefore, the prior art structure is still far from solving the problem associated with the failure to ignite the fuel oil and, if the problem is desired to be solved without the starting and warm-up performance being adversely affected, the injection timing has to be advanced. As hereinbefore described, the advancement of the injection timing brings about the problem associated with the noise generation.

Moreover, in the prior art structure of the turbulent combustion chamber shown in FIG. 1, the angle θ is relatively small between the plane of the flat bottom 7 and the plane in which that portion of the wall defining the connecting throat, which is situated on one side adjacent the longitudinal axis of the primary combustion chamber 1 lies. The employment of the relatively small angle θ has been found disadvantageous in that the swirling air a, that is, the combustion gases of the mixture ignited within the turbulent combustion chamber can not be smoothly guided towards the primary combustion chamber through the connecting throat 3 and, therefore, the stream of the combustion gases flowing toward the primary combustion chamber 1 through the connecting throat 3 can not be intensified. In addition, another disadvantage has also been found that no good heat dispersion take place at the acute-angled portion represented by the angle θ and, since the acute-angled portion is apt to be heated by the fuel oil being injected, the heat load is high at that acute-angled portion.

In order to obviate the problems as hereinbefore described, it may be contemplated to increase the angle θ. If the angle θ is increased, the connecting throat would be directed downwards, resulting in the possibility that the expanding gases caused by the combustion within the turbulent combustion chamber and subsequently flowing through the connecting throat impinge upon the top face of the piston with the velocity thereof consequently reduced. This may in turn result in that the expanding gas entering the primary combustion chamber would not be uniformly distributed all over the primary combustion chamber and the remainder of the air within the primary combustion chamber would not be fully utilized, with the diesel engine tending to emit a relatively large amount of smoke particularly during a high load operating condition.

Separate from the employment of the connecting throat having its effective cross-sectional surface area gradually increasing towards the turbulent combustion chamber as hereinbefore discussed, Japanese Laid-open Utility Model Publication No. 52-8907, published in 1977, discloses the turbulent combustion chamber having its flat bottom inclined downwards so as to converge with the undersurface of the cylinder head at an angle within the range of 5° to 60°, while the connecting throat has its longitudinal axis inclined upwards at an angle within the range of 30° to 45° relative to the undersurface of the cylinder head so as to intersect with the inclined plane of the flat bottom at an angle not less than 45°. The purpose of the design disclosed in the last mentioned publication is described to minimize the heat load evolved on the acute-angled portion between the wall defining the connecting throat and the flat bottom thereby to increase the durability of the cylinder head. This last-mentioned publication neither discloses nor suggests at all the improvement in engine starting performance, the minimization of the smoke emission, and the maximization of the use of the air within the primary combustion chamber, and this is evidenced by the facts that the last mentioned publication is silent as to the relationship between the fuel injection nozzle and the angle of the inclination of the flat bottom, that the connecting throat is shown as having a uniform effective cross-sectional surface area all over the entire length thereof, and that the numerical limitations for the various angles disclosed therein include the arrangement wherein the connecting throat may extend substantially perpendicular to the top face of the piston.

SUMMARY OF THE INVENTION

The present invention has been developed with a view to substantially eliminating the disadvantages and inconveniences inherent in the prior art diesel engines of a type having a turbulent combustion chamber and has for its essential object to provide an improved diesel engine of a type having a turbulent combustion chamber, which engine is capable of exhibiting a high engine starting performance with the minimized emission of the white smoke and also the minimized generation of noises.

Another important object of the present invention is to provide an improved diesel engine of the type referred to above, which is also capable of exhibiting a high engine output performance particularly during a high load engine operating condition.

In order to accomplish these objects of the present invention, there is provided an improved diesel engine having a turbulent combustion chamber wherein the flat bottom is so inclined upwardly relative to the undersurface of the cylinder head as to permit the plane of the flat bottom to converge with the longitudinal axis of the primary combustion chamber, said turbulent combustion chamber being communicated with the primary combustion chamber through a connecting throat which has one end opening at the flat bottom of the turbulent combustion chamber and the opposite end opening towards the primary combustion chamber, the opening of said one end of the connecting throat being larger than that of said opposite end of the same connecting throat. In addition, a fuel injection nozzle for injecting fuel oil into the turbulent combustion chamber is so arranged as to inject the fuel oil towards a corner area of the turbulent combustion chamber which connects the flat bottom with the generally spherical wall of the turbulent combustion chamber.

More specifically, according to the present invention, the connecting throat has such a cross-sectional representation that the opening at one end thereof adjacent the turbulent combustion chamber is larger than that at the other end thereof adjacent the primary combustion chamber, while the fuel injection nozzle is so arranged as to inject fuel oil so as to impinge upon the corner area between the flat bottom of the turbulent combustion chamber and the wall portion which is contiguous to and extends obtusely from the flat bottom so that, after the impingement upon that corner area, the injected fuel oil can scatter in a direction generally counter to the direction of flow of the swirling air entering the turbulent combustion chamber through the connecting throat, that is, in a direction towards that center area of the turbulent combustion chamber where the temperature is maximized, thereby to facilitate the uniform mixing of the fuel oil with the air. The mixture so formed and still swirling within the turbulent combustion chamber is subsequently ignited and the resultant expanding gases are smoothly guided through the connected throat towards the primary combustion chamber.

With the construction according to the present invention, thanks to the uniform mixing of the injected fuel oil with the air, the improvement in direction in which the injected fuel oil is scattered (towards the highest temperature zone within the turbulent combustion chamber), and the retardation of the swirling air, the ignitability and the combustibility of the fuel can be improved with a view to minimizing the failure of the engine to ignite the fuel, the occurrence of diesel knocking and, therefore, the advancement of the injection timing can be reduced with the noise generation minimized.

Furthermore, in view of the flat bottom of the turbulent combustion chamber inclined, the expanding gases resulting from the combustion of the mixture within the turbulent combustion chamber can smoothly be guided towards the connecting throat. In addition, the function of the connecting throat having the varying effective cross-section surface area, which is to intensify the stream of the expanding gases flowing towards the primary combustion chamber through the connecting throat and to distribute the expanding gases over the primary combustion chamber, permits the air remaining within the primary combustion chamber to be substantially fully utilized so that not only can the engine power output be increased, but the emission of smoke containing carbon particulates, which tends to occur during the high load engine operating condition, can also be minimized.

BRIEF DESCRIPTION OF THE DRAWINGS

These and other objects and features of the present invention will become clear from the following detailed description taken in conjunction with preferred embodiments thereof with reference to the accompanying drawings, in which.

DETAILED DESCRIPTION OF THE EMBODIMENTS

Before the description of the present invention proceeds, it is to be noted that like parts are designated by like reference numerals through the accompanying drawings except for FIG. 1.

Figure 2:
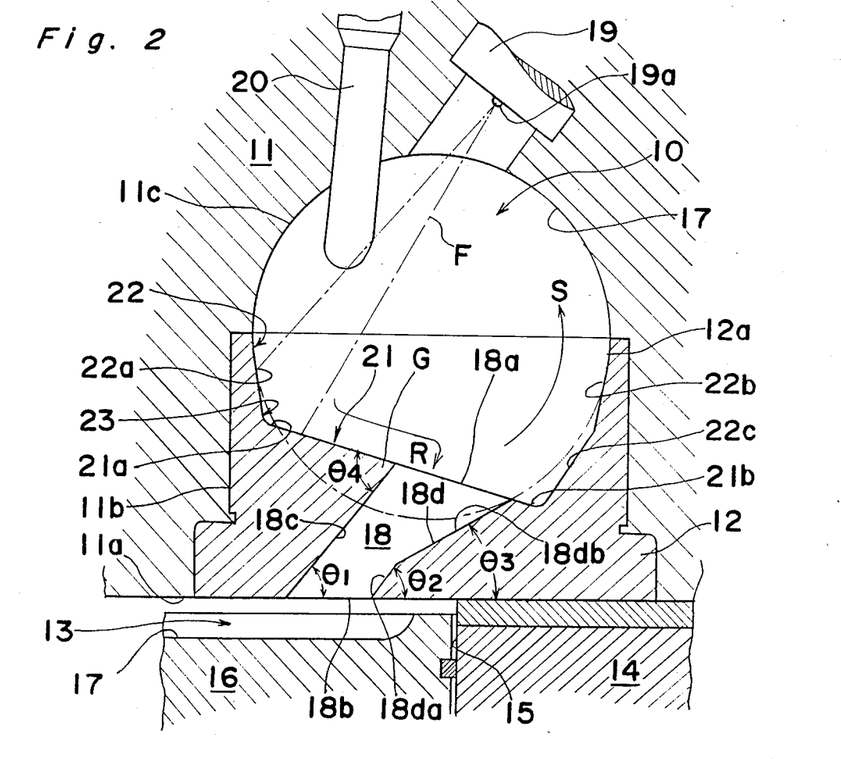
FIG. 2 is a longitudinal section view of a diesel engine according to a first preferred embodiment of the present invention showing the details of the turbulent combustion chamber.
Figure 3:
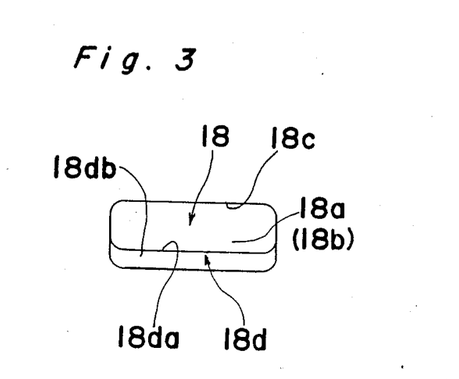
FIG. 3 is a top plan view showing a connecting throat in the engine of FIG. 2.

Referring first to FIGS. 2 and 3, a diesel engine shown therein comprises a cylinder block 14 having at lest one cylinder bore 15 defined therein with a piston 16 axially movably received in said cylinder bore 15, and a cylinder head 11 mounted on the cylinder block 14 with its undersurface 11a tightly closing the top opening of the cylinder bore 15 to define a primary combustion chamber 13 between said undersurface 11a and the inwardly recessed top face 17 of the piston 16, the volume of said primary chamber 13 being variable according to the movement of the piston 16 within the cylinder bore 15 as is well known to those skilled in the art. The cylinder head 11 has a turbulent combustion chamber 10 defined therein, in a manner which will subsequently be described, at a location offset laterally from the longitudinal axis of the piston 16 and adjacent the outer periphery of said piston 16, said turbulent chamber 10 being communicated with the primary chamber 13 through an inclined connecting throat 18 having a generally rectangular cross-section representation as best shown in FIG. 3.

More specifically, the cylinder head 11 has a circular cross-sectioned recess 11b defined therein so as to extend inwardly thereof at right angles to the undersurface 11a, and also a hemispherical recess 11c defined therein on one side of the recess 11b opposite to the undersurface 11a and in communication with and in concentrical relation to the recess 11b, said hemispherical recess 11c having the opening of a diameter smaller than that of the recess 11b. The hemispherical recess 11c forms that portion of the turbulent chamber 10 which is delimited by the hemispherical wall 17, the remaining portion of said turbulent chamber 10 being formed in an insert block 12 which will now be described.

The insert block 12, which may be made of either any known metallic material such as stainless steel or a ceramic material such as, for example, silicon nitride known as having a high resistance to thermal shock, is pressure-fitted into, or otherwise secured in any known manner in, the circular cross-sectioned recess 11b. This insert block has defined therein a recess 12a, the opening of said recess 12a having a diameter equal to that of the hemispherical recess 11c. The recess 12a in the insert block 12 forms the remaining portion of the turbulent chamber 10 which is delimited by a flat bottom wall 21 of generally circular shape and an inwardly curved side wall 22 continued to and integral with the bottom wall 22 so as to form a gently concaved corner area 23 between the side wall 22 and the bottom wall 21. The inwardly curved side wall 22 has the same radius of curvature as that of the hemispherical wall 17, and the hemispherical wall 17 and the side wall 22 together comprise respective portions of the wall of a sphere depicted by the chain line in FIG. 2, the center of which sphere lies on, or substantially on, the plane of the opening of the recess 11c in the cylinder head 11 which is concurrently occupied by and hence, coplanar with the opening of the recess 12a in the insert block 12.

The bottom wall 21 of the recess 12a in the insert block 12 is situated generally inwardly of the sphere depicted by the walls 17 and 22 and is downwardly inclined in a direction away from the longitudinal axis of the cylinder bore 15 with a portion 21a of the bottom wall 21 closest to the longitudinal axis of the cylinder bore 15 being upwardly shifted relative to the circumferentially opposite portion 21b of the same bottom wall remotest to the longitudinal axis of the cylinder bore 15. In other words, the bottom wall 21 is tilted so as to face towards the primary chamber 13. Thus, it will be readily seen that the width of the side wall varies in the circumferential direction, the minimum width being attained at an area 22a adjacent the portion 21a of the bottom wall 21 closest to the longitudinal axis of the cylinder bore 15 while the maximum width is attained at the opposite area 22b adjacent the portion 21b of the bottom wall 21 remotest from the longitudinal axis of the cylinder bore 15.

For the purpose of the description of the present invention, that opposite portions 21a and 21b of the bottom wall 22 closest to and remotest from the longitudinal axis of the cylinder bore 15 will be hereinafter referred to as "raised area" and "lowered area" of the bottom wall 21, respectively.

A fuel injector 19 having a nozzle 19a is carried by the cylinder head 11 so as to inject fuel oil F from the nozzle 19a onto the turbulent chamber 10. In accordance with the present invention, the fuel injection nozzle 19a, while the injector 19 is supported by the cylinder head 11, is so oriented as to inject the fuel oil F towards that portion of the corner area 23 which connects between the raised area 21a of the bottom wall 21 and the area 22a of the side wall 22. By so doing, the fuel oil F injected from the nozzle 19a can, after having impinged upon that portion of the corner area 23, be scattered by the gently curved wall comprising that portion of the corner area 23 substantially towards the central region of the turbulent chamber 10 where the temperature tends to be high as compared with that in the other region of the chamber 10, whereupon the scattered fuel oil adjoins the air, as will be described later, swirling within the chamber 10 in a direction shown by the arrow S and is then uniformly mixed with the air. Reference numeral 20 represents a glow plug which is utilized during the starting of the engine to ignite the resultant mixture of fuel oil with air within the turbulent chamber 10. As shown in FIG. 2, glow plug 20 has a free end projecting into chamber 10 at a location downstream of the swirling air flow. A portion of the fuel from injection nozzle 19 is shown impinging on the free end of the glow plug.

The insert block 12 also has a connecting throat 18 defined therein. This throat 18 has one end 18a opened at the bottom wall 21 in communication with the turbulent chamber 10 and the other end 18b opened at the surface of the insert block 12, which is in flush with the undersurface 11a of the cylinder head 11, in communication with the primary chamber 13, a substantially intermediate portion of said throat 18 being inclined upwardly from the end 18b towards the end 18a so as to diverge from the longitudinal axis of the cylinder bore 15. As best shown in FIG. 3, the throat 18 is of generally rectangular cross-section delimited by a pair of opposed long-sided walls 18c and 18d and a pair of opposed short-sided walls, the longer sides of the rectangular shape of the throat 18 lying in a direction perpendicular to the longitudinal axis of the cylinder bore 15. By the reason which will subsequently become clear, the opening at the end 18a of the throat 18 is larger than that at the opposite end 18b thereof. While one of the long-sided walls which is on one side of the throat adjacent the longitudinal axis of the cylinder bore 15, that is, the long-sided wall 18c, is inclined upwardly at a predetermined angle $\theta 1$ relative to the plane parallel to the undersurface 11a of the cylinder head 11, the other long-sided wall 18d includes a lower wall portion 18da adjacent the end 18b which is upwardly inclined at a predetermined angle $\theta 2$ relative to the plane parallel to the undersurface 11a, and an upper wall portion 18db adjacent the end 18a which is bent from the lower wall portion 18da so as to upwardly incline at a predetermined angle $\theta 3$ relative to the plane parallel to the undersurface 11a, the angle $\theta 2$ being selected to be equal to or slightly greater than the angle $\theta 1$ while the angle $\theta 3$ is selected to be greater than any one of the angles $\theta 1$ and $\theta 2$. It is to be noted that, for the purpose of enabling the manufacture of the insert block by the use of separate molds, the point at which the long-sided wall 18d is bent to provide the lower and upper wall portions 18da and 18db on respective sides thereof should be located on or with respect to the longitudinal axis of the cylinder bore 15, outwardly of the imaginary plane lying at right angles to the plane parallel to the undersurface 11a and touching the edge G which is delimited by the wall 18c and the bottom wall 21 and comprises a portion of the rectangular peripheral lip of the opening at the end 18a of the throat 18. By this design, it will readily be seen that, after the casting of the insert block 12, one of the molds used to form the recess 12a and an upper portion of the throat 18 and the other of the molds used to form a lower portion of the throat 18 can be readily and smoothly removed away from each other in a direction perpendicular to the surface of the insert block 12 where the end 18b is opened and in a direction parallel to the wall 18c, respectively, leaving the throat 18 in the insert block 12.

With the connecting throat 18 so defined, the area 22b of the side wall 22 adjacent the lowered area 21b of the bottom wall 21 is partially flattened at 22c so as to form an obtuse angle between it and the bottom wall 21 so that air being compressed in the primary chamber 13 and entering the throat 18 can flow smoothly into the turbulent chamber 10, swirling in the direction shown by S.

The turbulent chamber 10 of the construction hereinbefore described with reference to FIGS. 2 and 3 functions in the following manner. Assuming that the engine is under the compression stroke with the piston 16 approaching the top dead center position, the air entering the throat 18 from the primary chamber 13 is decelerated as it flows therethrough into the turbulent chamber 10 because of the effective cross-sectional surface area of said throat 18 increasing form the end 18b towards the end 18a. In addition, since the bottom wall 21 has its plane positioned generally inwardly of the sphere depicted by the hemispherical wall 17 and the inwardly curved side wall 22, the air entering the turbulent chamber 10 collides against the bottom wall 21, thereby being further decelerated so that the air within the turbulent chamber 10 will swirl at a velocity sufficient to avoid the blow-off of the subsequently ignited mixture of fuel oil with air.

The fuel oil subsequently injected from the nozzle 19a of the fuel injector 19 travels towards that portion of the corner area 23 delimited by the raised area 21a of the bottom wall 21 and the area 22a of the side wall 22, spreading at an appropriate angle. The fuel oil F so injected is, after having impinged upon that portion of the corner area 23, scattered at various angles toward the center region of the turbulent chamber 10 where is a high temperature region, adjoining the swirling air to provide the fuel oil uniformly mixed with the air.

During the cold start of the engine, the injected fuel oil can with no fault be ignited by the aid of the glow plug 20. Whetherever the fuel oil within the turbulent chamber 10 is ignited by the aid of the glow plug or the high temperature of the compressed air introduced from the primary chamber 13 into the turbulent chamber 10 through the connecting throat 18, the expanding gases produced by the partial combustion of the fuel is, together with the remaining fuel having not been burned completely, guided along the inclined bottom wall 21 in a direction shown by the arrow R, entering the connecting throat 18 through the opening at the end 18a of the throat 18. The expanding gases entering the throat 18 is, as they flow through the throat 18, throttled and, thence, accelerated, finally spurting into the primary chamber 13 with the remaining fuel being consequently burned to drive the piston 16 on its working stroke. It is to be noted that the remaining compressed air within the primary chamber 13 can be totally utilized for the combustion within the primary chamber 13 because the expanding gases flowing through the throat 18 can be gushed at high velocity into the primary chamber 13 and, then, guided by the contour of the recess at the top face 17 of the piston 16 so as to spread towards a portion of the primary chamber 13 remote from the open end 18b of the throat 18. Thus, the rate of utilization of the air is improved according to the present invention. This is particularly important and advantageous in the improvement of the engine power output during the high load, high speed operating condition of the engine and also in the minimization of the emission of the smoke (containing a high percentage of carbon particulates) which tends to be emitted during the high load, high speed operating condition of the engine.

In addition, because of the bottom wall 21 upwardly inclined towards the longitudinal axis of the cylinder bore 15, the angle $\theta$ between the bottom wall 21 and the adjacent longer-sided wall 18c can take a relatively great value and, therefore, that portion of the insert block 12 which is delimited by the bottom wall 21 and the long-sided wall 18c can withstand a relatively large heat load.

In the foregoing description of the first preferred embodiment of the present invention, one of the long-sided walls of the throat 18 remote from the longitudinal axis of the cylinder bore 15, that is, the long-sided wall 18d has been shown and described as bent to provide the two different angles $\theta 2$ and $\theta 3$ of inclination. However, the long-sided wall 18d may be straight over the entire length thereof, being inclined at a predetermined angle $\theta 5$ relative to the plane parallel to the undersurface 11a, it being, however, essential for the angle $\theta 5$ to be smaller than the angle $\theta 1$ of inclination of the opposite long-sided wall 18c, as shown in FIGS. 4 and 5.

Figure 4:
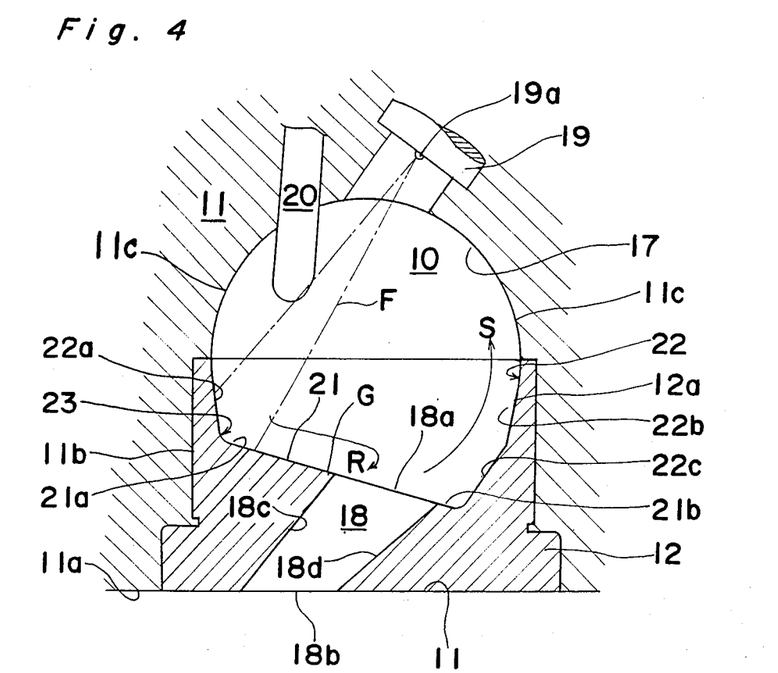
FIG. 4 is a view similar to FIG. 2, showing another preferred embodiment of the present invention.
Figure 5:
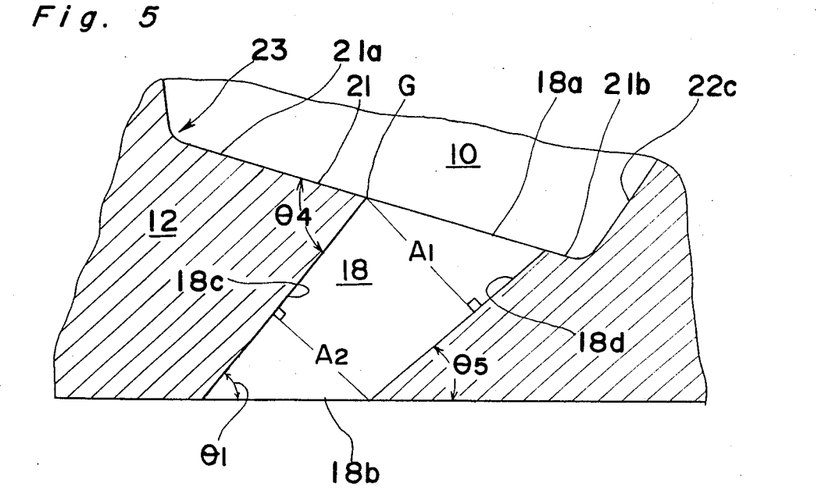
FIG. 5 is a fragmentary section view, on an enlarged scale, of a portion of the engine of FIG. 4, showing the details of the connecting throat.

Referring now to FIGS. 4 and 5, the long-sided wall 18d is shown as straight, being inclined at the angle $\theta 5$ relative to the plane parallel to the undersurface. While the particular values of the angles $\theta 1$, $\theta 4$ and $\theta 5$ will be discussed in detail subsequently, care must be taken for the purpose of facilitating the manufacture of the insert block 12 in the embodiment of FIGS. 4 and 5 by the use of the separable molds in a manner similar to that described in connection with the foregoing embodiment, that the peripheral lip portion of the opening at the end 18b which is continued to the long-sided wall 18d must be positioned on or, with respect to the longitudinal axis of the cylinder bore 15, outwardly of the imaginary plane perpendicular to the plane parallel to the undersurface 11a and touching the edge G which is delimited by the bottom wall 21 and the long-sided wall 18c and comprises the portion of the rectangular peripheral lip of the opening at the end 18a of the throat 18.

So far shown in FIGS. 4 and 5, the angles $\theta 1$, $\theta 5$ and $\theta 4$ are selected 50°, 40° and 67.5°, respectively. However, a series of tests conducted have shown that the satisfactory result can be obtained with the angles $\theta 1$, $\theta 5$ and $\theta 4$ being within the respective ranges of 45° to 55°, 35° to 45° and 60° to 80°. The reason for the determination of the range for each angle $\theta 1$, $\theta 5$ or $\theta 4$ will now be described with particular reference to FIG. 5, it being, however, to be noted that the cross-sectional surface areas designated by A1 and A2, respectively, are defined as follows:

A1: The cross-sectional surface area adjacent the open end 18a of the throat 18, measured in a plane perpendicular to the long-sided wall 18d and extending therefrom so as to touch one of the longer sides of the rectangular shape of the open end 18a which is opposite to the long-sided wall 18d.

A2: The cross-sectional surface area adjacent the open end 18b of the throat, measured in a plane perpendicular to the long-sided wall 18c and extending therefrom so as to touch one of the longer sides of the rectangular shape of the open end 18b which is opposite to the long-sided wall 18c. This cross-sectional surface area A2 depends on the size of the engine and is fixed once the engine size has been determined.

Figure 10:
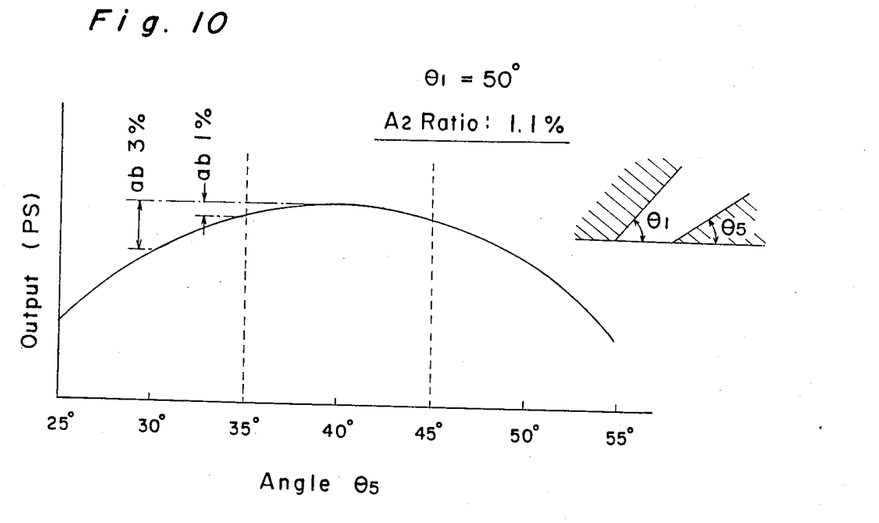
FIG. 10 is a graph showing the relationship between the engine power output and the angle of inclination of one wall of the connecting throat.

With respect to the angle $\theta 1$ of inclination of the long-sided wall 18c on one side of the throat 18 adjacent the longitudinal axis of the cylinder bore 15 (FIG. 2), if the angle $\theta 1$ is not greater than 45°, the surface area adjacent the turbulent chamber 10 will be of a relatively small value for the given angle $\theta 5$ and the effect to retard the flow of the compressed gas into the turbulent chamber 10 through the throat 18 will be reduced, and if the angle $\theta 1$ is not smaller than 55°, the angle of incidence of the expanding gases, which enter the primary combustion chamber 13, upon the top face of the piston 16 will be increased to such an extent as to result in the retarded flow of the expanding gases into the primary chamber 13. With respect to the angle $\theta 5$, and referring to the graph of FIG. 10 which is obtained when the angle $\theta 1$ is fixed at 50° and the ratio of the cross-sectional surface area A2 relative to the surface area of the top face of the piston 16 is selected 1.1% as will be described later, if the angle $\theta 5$ is not greater than 35°, an edge will be formed and the heat load will be increased, and if the angle $\theta 5$ is not smaller than 45°, the angle of incidence of the expanding gases upon the top face of the piston 16 will be of a relatively great value as is the case with the angle $\theta 1$ being not smaller than 55° resulting in the retarded flow of the expanding gases into the primary chamber 13.

With respect to the angle $\theta 4$, if it is not greater than 60°, the heat load will be increased and the smooth flow of the expanding gases within the turbulent chamber 10 into the throat 18 will be hampered, and if it is not smaller than 80°, not only will the effect of the corner area 21a to retard the swirling air within the turbulent chamber 10 be reduced, but also the volume of the turbulent chamber 10 will be of a relatively small value.

Figure 11:
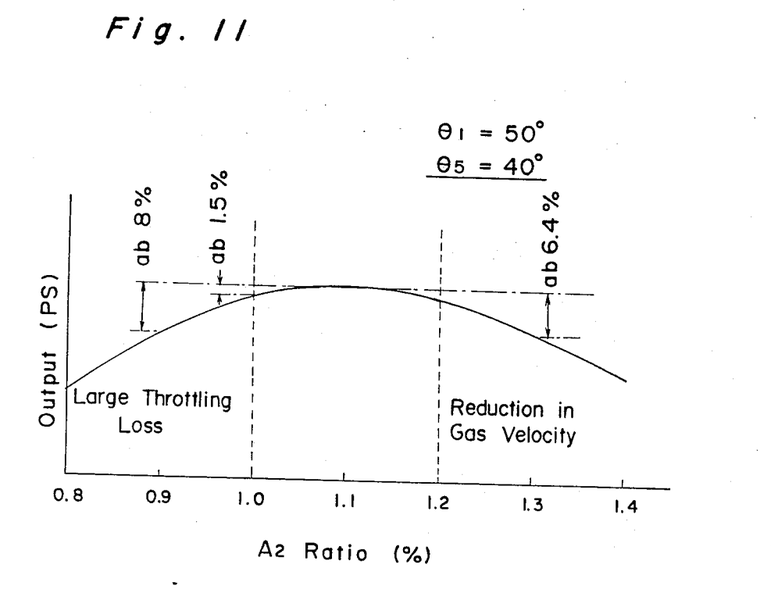
FIG. 11 is a graph showing the relationship between the engine power output and the ratio of the minimum effective cross-sectional surface area of the connecting throat relative to the surface area of the top face of the piston.

According to another feature of the present invention, referring to the graph of FIG. 11 which is obtained when the angles $\theta 1$ and $\theta 5$ are fixed at 50° and 40°, respectively, the ratio of the surface area A2 relative to the surface area of the top face of the piston 16, simply referred to as "A2 Ratio", is selected within the range of 1.0 to 1.2%, preferably about 1.1%. The ratio of the surface area A1 relative to the surface area of the top face of the piston 16 is determined by selecting a particular value for each of the angles $\theta1$, $\theta4$ and $\theta5$ and is preferred to be about 2.0%.

Figure 6:
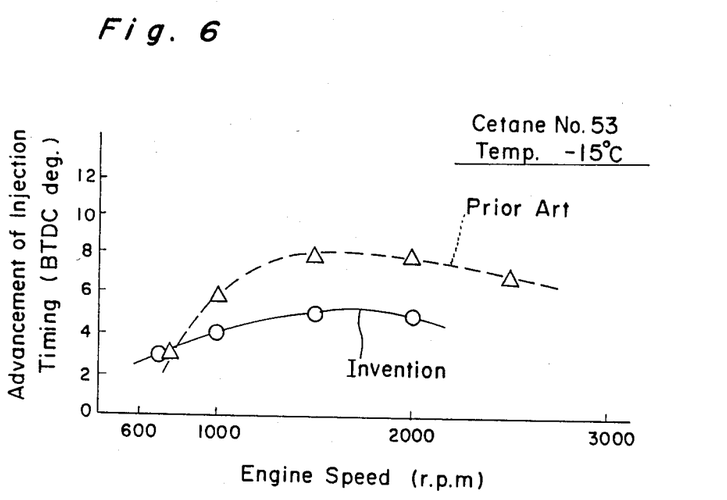
FIGS. 6 and 7 are graphs each showing the relationship between the advancement of the ignition timing and the engine speed, which are exhibited by the engine according to the present invention and the prior art engine when fuel oil of a different cetane number is used.
Figure 7:
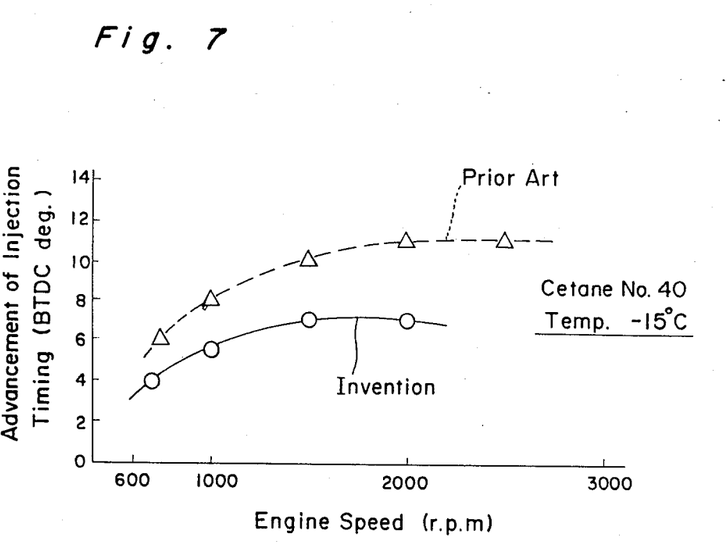

FIGS. 6 and 7 illustrate respective graphs which were obtained as a result of tests conducted to determine the injection timing (advancement) required to avoid the failure to ignite the fuel within the prior art turbulent chamber of a construction substantially as shown in FIG. 1 and the turbulent chamber according to the present invention. The advancement of the injection timing was measured in terms of degree starting from the BTDC position of the piston, the graph of FIGS. 6 and 7 being obtained when the fuel of 53 in cetane number and that of 40 in cetane number were used, respectively, with the ambient temperature being $-15°$ C. in both cases. Both of the engines with the prior art turbulent chamber and the turbulent chamber according to the present invention had a compression ration of 23.0.

From any one of these graphs of FIGS. 6 and 7, it is clear that the advancement of the injection timing according to the present invention is smaller than that required according to the prior art generally by about 4°. In particular, even where the fuel of 40 in cetane number was used, the remarkable effect was obtained in that the advancement required in the practice of the present invention was very small as compared with that according to the prior art.

Figure 8:
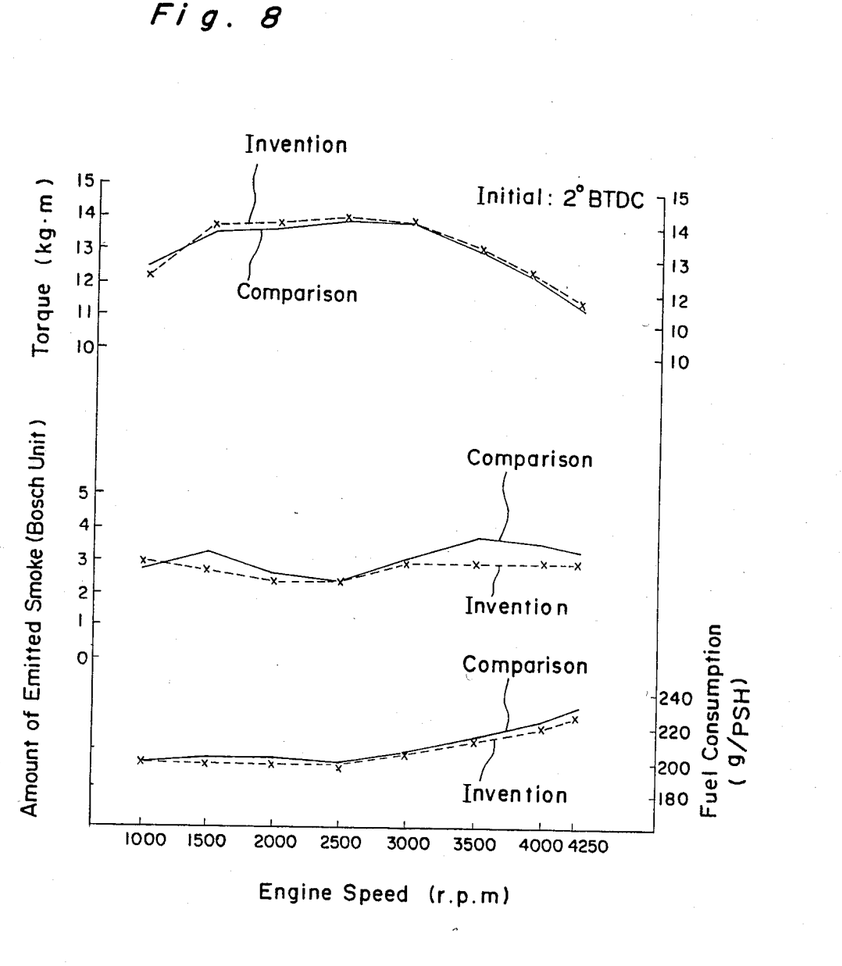
FIGS. 8 and 9 are graphs showing the full load performance and the part load performance, respectively, of the engine according to the present invention.
Figure 9:
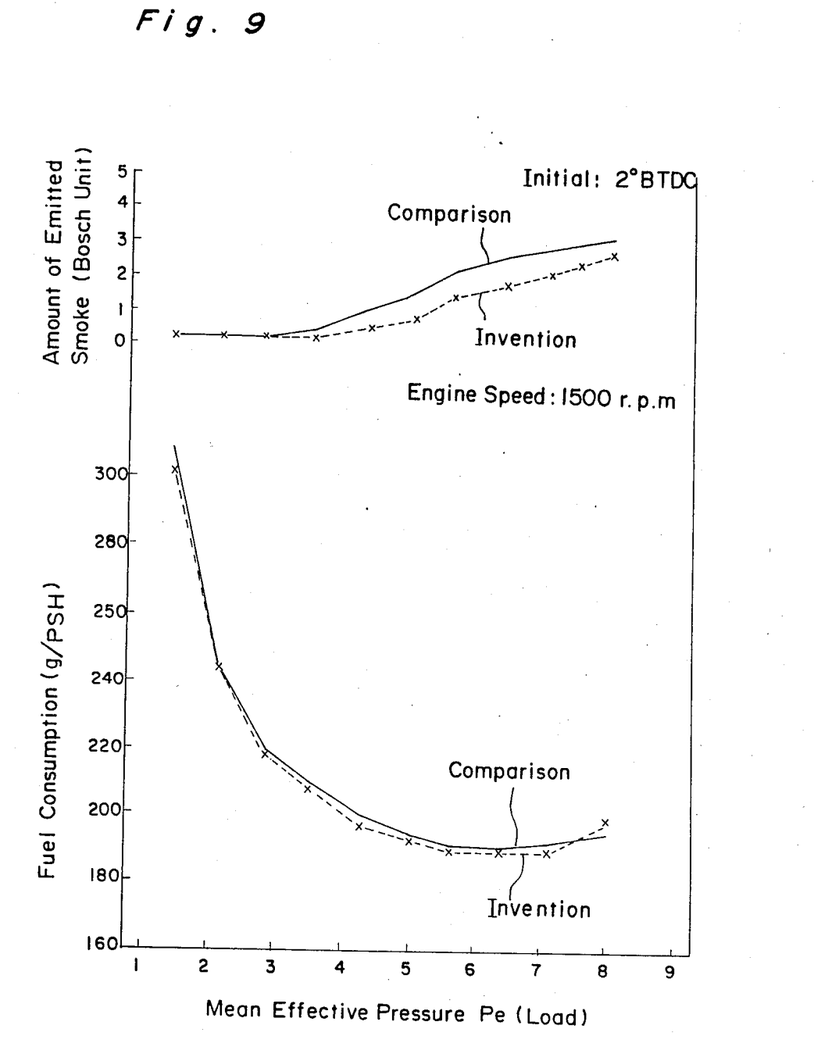

FIGS. 8 and 9 illustrate the full load performance and the part load performance (at 1,500 rpm) of the diesel engine with the turbulent chamber according to the present invention, respectively, shown together with those of the diesel engine with the turbulent chamber designed, only for the purpose of comparison, so as to have an inclined bottom wall as is the case with the present invention, but having the connecting throat of uniform cross-sectional area over the entire length thereof.

As can be understood from the graph of FIG. 8, at full load performance, the engine according to the present invention is excellent in output performance with both the reduced smoke emission and the reduced mileage at a high speed region, as compared with the comparison. Even at part load performance as shown in FIG. 9, the engine according to the present invention exhibited the reduced smoke emission and fuel consumption.

Thus, the meritorious effects described above can, according to the present invention, be appreciated when a combination of the inclined bottom wall and the connecting throat of varying effective cross-sectional area is employed as hereinbefore fully described.

Although the present invention has fully been described in connection with the preferred embodiments thereof with reference to the accompanying drawings, it is to be noted that various changes and modifications are apparent to those skilled in the art. Such changes and modifications are to be understood as included within the true scope of the present invention unless they depart from the scope of the appended claims as set forth subsequently.

I claim:

1. In a diesel engine comprising a cylinder head having a turbulent combustion chamber defined therein, a cylinder block having a cylinder bore defined therein, said turbulent chamber being positioned offset laterally of the longitudinal axis of the cylinder bore, a piston reciprocatingly accommodated within the cylinder bore and defining a primary combustion chamber in cooperation with the cylinder head and the cylinder bore, said cylinder head also having a connecting throat defined therein for communicating between the primary chamber and the turbulent chamber, and a fuel injection nozzle for injecting fuel into the turbulent chamber, the improvement wherein the turbulent chamber is constituted by a flat bottom wall and a generally spherical wall, at least a portion of said flat bottom wall being positioned inwardly of the sphere generally represented by the spherical wall and having its periphery inwardly curved and continued to the spherical wall, said bottom wall being downwardly inclined in a direction away from the longitudinal axis of the cylinder bore with a first portion of said bottom wall closest to the longitudinal axis of the cylinder bore being upwardly raised relative to the opposite, second portion thereof remotest from said longitudinal axis of the cylinder bore, wherein said connecting throat has one end opening into the turbulent chamber at a location adjacent said second portion of the bottom wall and the other end opening into the primary chamber at a position adjacent the periphery of the cylinder bore, the opening of said one end of the throat being larger than that of said other end of the throat, said throat being upwardly inclined relative to the plane perpendicular to the longitudinal axis of the cylinder bore and being tapered towards the primary combustion chamber, the throat having its effective cross-sectional surface area gradually increasing from said other end of the throat towards said one end of the throat, and wherein said injection nozzle is oriented so as to inject fuel in a direction towards that portion of a corner area between the bottom wall and the spherical wall that is adjacent said first portion of the bottom wall.

2. An engine as claimed in claim 1, further comprising an insert block, all of said connecting throat, said flat bottom wall and a portion of said spherical wall adjacent said flat bottom wall being defined in said insert block, said insert block being inserted into a recess defined in the cylinder head to complete the turbulent chamber, and wherein said throat is of a generally rectangular cross section including a pair of opposite short-sided walls and a pair of opposite long-sided walls, and wherein the edge which is delimited by one of the long-sided walls on one side of the throat remotest from the longitudinal axis of the cylinder bore and a surface of the insert block flush with the surface of the cylinder head which confronts the cylinder bore is positioned offset laterally from the edge which is delimited by the other of the long-sided walls on one side of the throat closest to the longitudinal axis of the cylinder bore and the bottom wall.

3. An engine as claimed in claim 1, further comprising an insert block, all of said connecting throat, said flat bottom wall and a portion of said spherical wall adjacent said flat bottom wall being defined in said insert block, said insert block being inserted into a recess defined in the cylinder head to complete the turbulent chamber, and wherein said throat is of a generally rectangular cross section including a pair of opposite short-sided walls and a pair of opposite long-sided walls, and wherein the edge which is delimited by one of the long-sided walls on one side of the throat remotest from the longitudinal axis of the cylinder bore and a surface of the insert block flush with the surface of the cylinder head which confronts the cylinder bore is positioned in overlapping relation to the edge which is delimited by the other of the long-sided walls on one side of the throat closest to the longitudinal axis of the cylinder bore and the bottom wall, said one of the long-sided walls having a lower wall portion adjacent the other end of the throat extending generally in parallel relation to the angle of inclination of said other of the long-sided walls.

4. In a diesel engine comprising a cylinder head having a turbulent combustion chamber defined therein, a cylinder block having a cylinder bore defined therein, said turbulent chamber being positioned offset laterally of the longitudinal axis of the cylinder bore, a piston reciprocatingly accommodated within the cylinder bore and defining a primary combustion chamber in cooperation with the cylinder head and the cylinder bore, said cylinder head also having a connecting throat defined therein for communicating between the primary chamber and the turbulent chamber, a glow plug supported by the cylinder head and projecting into the turbulent chamber and a fuel injection nozzle for injecting fuel into the turbulent chamber, the improvement wherein the turbulent chamber is constituted by a flat bottom wall and a generally spherical wall, at least a portion of said flat bottom wall being positioned inwardly of the sphere generally represented by the spherical wall and having its periphery inwardly curved and continued to the spherical wall, said bottom wall being downwardly inclined in a direction away from the longitudinal axis of the cylinder bore with a first portion of said bottom wall closest to the longitudinal axis of the cylinder bore being upwardly raised relative to the opposite, second portion thereof remotest from said longitudinal axis of the cylinder bore, wherein said connecting throat has one end opening into the turbulent chamber at a location adjacent said second portion of the bottom wall and the other end opening into the primary chamber at a position adjacent the periphery of the cylinder bore, the opening of said one end of the throat being larger than that of said other end of the throat, said throat being upwardly inclined relative to the plane perpendicular to the longitudinal axis of the cylinder bore and having its substantially intermediate portion of an effective cross-sectional surface area increasing in a direction from said other end of the throat towards said one end of the throat, said throat being tapered towards said primary combustion chamber wherein said injection nozzle is oriented so as to inject fuel in a direction towards that portion of a corner area between the bottom wall and the spherical wall that is adjacent said first portion of the bottom wall, said glow plug projecting into the turbulent chamber with its free end terminating at a location downstream of a swirling flow of air relative to said injection nozzle, and said injection nozzle being positioned so as to confront the free end of the glow plug so that at least a portion of the fuel injected thereby can impinge upon the glow plug.

5. An engine as claimed in claim 4, wherein the ratio of the minimum cross-sectional surface area of the throat adjacent said other end of the throat relative to the surface area of the top face of the piston is within the range of 1.0 to 1.2%.

6. An engine as claimed in claim 5, wherein said throat is of a generally rectangular cross section and is constituted by a pair of opposite short-sided walls and a pair of opposite long-sided walls, one of said long-sided walls on one side of the throat adjacent the longitudinal axis of the cylinder bore being inclined at an angle within the range of 45° to 55° while the other of said long-sided walls on one side of the throat remotest from the longitudinal axis of the cylinder bore is inclined at an angle within the range of 35° to 45°.

7. An engine as claimed in claim 6, wherein the angle delimited by said one of the long-sided walls and the flat bottom wall is within the range of 60° to 80°.

8. In a diesel engine comprising a cylinder head having a turbulent combustion chamber defined therein, a cylinder block having a cylinder bore defined therein, said turbulent chamber being positioned offset laterally of the longitudinal axis of the cylinder bore, a piston reciprocatingly accommodated within the cylinder bore and defining a primary combustion chamber in cooperation with the cylinder head and the cylinder bore, said cylinder head also having a connecting throat defined therein for communicating between the primary chamber and the turbulent chamber, and a fuel injection nozzle for injecting fuel into the turbulent chamber, the improvement wherein the turbulent chamber is constituted by a flat bottom wall and a generally spherical wall, at least a portion of said flat bottom wall being positioned inwardly of the sphere generally represented by the spherical wall and having its periphery inwardly curved and continued to the spherical wall, said bottom wall being downwardly inclined in a direction away from the longitudinal axis of the cylinder bore with a first portion of said bottom wall closest to the longitudinal axis of the cylinder bore being upwardly raised relative to the opposite, second portion thereof remotest from said longitudinal axis of the cylinder bore, wherein said connecting throat has one end opening into the turbulent chamber at a location adjacent said second portion of the bottom wall and the other end opening into the primary chamber at a position adjacent the periphery of the cylinder bore, the opening of said one end of the throat being larger than that of said other end of the throat, said throat being upwardly inclined relative to the plane perpendicular to the longitudinal axis of the cylinder bore and having its substantially intermediate portion of an effective cross-sectional surface area increasing in a direction from said other end of the throat towards said one end of the throat, the ratio of the minimum cross-sectional surface area of the throat adjacent said other end of the throat relative to the surface area of the top face of the piston is within the range of 1.0 to 1.2%, said throat is of a generally rectangular cross section and is constituted by a pair of opposite short-sided walls and a pair of opposite long-sided walls, one of said long-sided walls on one side of the throat adjacent the longitudinal axis of the cylinder bore being inclined at an angle within the range of 45° to 55° while the other of said long-sided walls on one side of the throat remotest from the longitudinal axis of the cylinder bore is inclined at an angle within the range of 35° to 45°, the angle delimited by said one of the long-sided walls and the flat bottom wall is within the range of 60° to 80°, and wherein said injection nozzle is oriented so as to inject fuel in a direction towards that portion of a corner area between the bottom wall and the spherical wall that is adjacent said first portion of the bottom wall.

* * * * *